(12) United States Patent
Kitaj et al.

(10) Patent No.: US 7,817,802 B2
(45) Date of Patent: Oct. 19, 2010

(54) CRYPTOGRAPHIC KEY MANAGEMENT IN A COMMUNICATION NETWORK

(75) Inventors: Paul Thomas Kitaj, Gilbert, AZ (US); Mary Eleanor Trengove, Phoenix, AZ (US); Douglas Allan Hardy, Scottsdale, AZ (US)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 940 days.

(21) Appl. No.: 11/625,993

(22) Filed: Jan. 23, 2007

(65) Prior Publication Data

US 2008/0085004 A1   Apr. 10, 2008

Related U.S. Application Data

(60) Provisional application No. 60/850,856, filed on Oct. 10, 2006.

(51) Int. Cl.
*H04L 9/16* (2006.01)
*H04L 9/08* (2006.01)
*H04L 9/32* (2006.01)

(52) U.S. Cl. ............... 380/281; 380/44; 713/171
(58) Field of Classification Search ............ 713/171; 380/281, 44
See application file for complete search history.

(56) References Cited

U.S. PATENT DOCUMENTS

| | | | |
|---|---|---|---|
| 6,038,322 A * | 3/2000 | Harkins | 380/279 |
| 6,363,154 B1 * | 3/2002 | Peyravian et al. | 380/283 |
| 7,107,051 B1 | 9/2006 | Walker | |
| 2004/0187001 A1 * | 9/2004 | Bousis | 713/175 |
| 2005/0084114 A1 * | 4/2005 | Jung et al. | 380/278 |
| 2008/0240427 A1 * | 10/2008 | Naslund | 380/44 |

OTHER PUBLICATIONS

Schneier, "Applied Cryptography: Protocols, Algorithms, and Source Code in C" Second Edition, Jon Wiley & Sons, 1996, pp. 180-184.*
Harney et al. RFC2094: "Group Key Management Protocol" 1997.*
Camtepe, Seyit A. et al. "Key Distribution Mechanisms for Wireless Sensor Networks: a Survey", Mar. 2005.*
Carman, David W. et al. "Constraints and Approaches for Distributed Sensor Network Security", Sep. 2000.*

(Continued)

*Primary Examiner*—Michael J Simitoski
(74) *Attorney, Agent, or Firm*—Meschkow & Gresham, P.L.C.

(57) ABSTRACT

A communication network (22) includes a central node (30) loaded with a trusted key (26) and key material (56) corresponding to an asymmetric key agreement protocol (48). The network (22) further includes vulnerable nodes (32) loaded with key material (69) corresponding to the protocol (48). Successive secure connections (68, 70) are established between the central node (30) and the vulnerable nodes (32) using the key material (56, 69) to generate a distinct session key (52) for each of the secure connections (68, 70). The trusted key (26) and one of the session keys (52) are utilized to produce a mission key (39). The mission key (39) is transferred from the central node (30) to each of the vulnerable nodes (32) via each of the secure connections (68, 70) using the corresponding current session key (52). The mission key (39) functions for secure communication within the communication network (22).

30 Claims, 6 Drawing Sheets

OTHER PUBLICATIONS

Choi, Sung Jin et al. "An Efficient Key Pre-distribution Scheme for Secure Distributed Sensor Networks", 2005.*
Eschenauer, Laurent et al. "A Key-Management Scheme for Distributed Sensor Networks", 2002.*
Menezes, Alfred J. et al. Handbook of Applied Cryptography, 1997 CRC Press, LLC, pp. 489-572.*
Perrig, Adrian et al. "ELK, a New Protocol for Efficient Large-Group Key Distribution", 2001.*

* cited by examiner

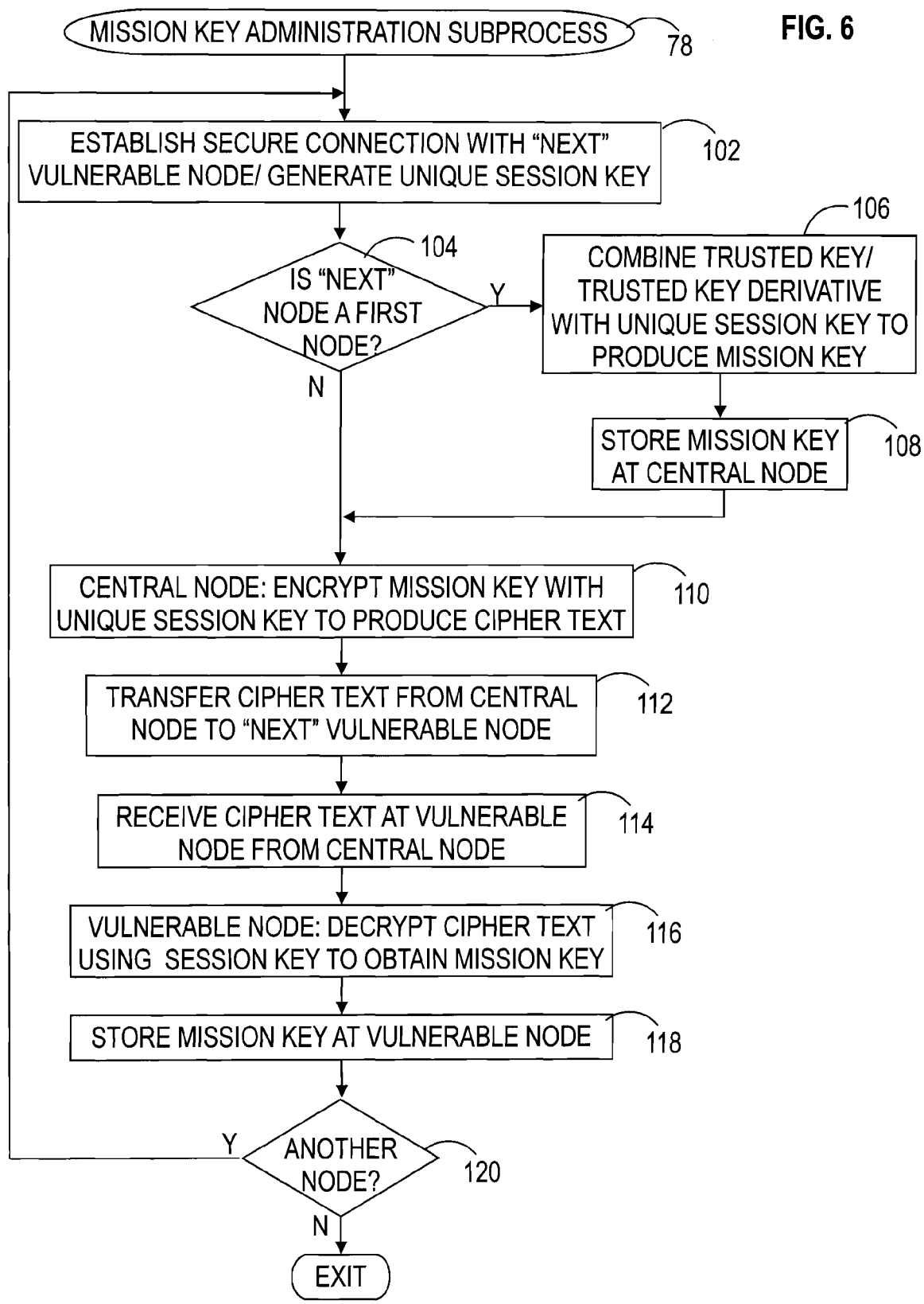

US 7,817,802 B2

CRYPTOGRAPHIC KEY MANAGEMENT IN A COMMUNICATION NETWORK

RELATED INVENTION

The present invention claims priority under 35 U.S.C. §119 (e) to: "Key Management For Disposable Cryptography," U.S. Provisional Patent Application Ser. No. 60/850,856, filed 10 Oct. 2006, which is incorporated by reference herein.

TECHNICAL FIELD OF THE INVENTION

The present invention relates to the field of cryptography. More specifically, the present invention relates to the utilization of encryption techniques for enhancing the security of a wireless communication network.

BACKGROUND OF THE INVENTION

A wireless network is a flexible data and voice communication medium implemented as an extension for, or as an alternative to, a wired network. By using radio frequency (RF) technology, wireless communication networks transmit and receive data and voice over the air, minimizing the need and the cost typically associated with a wired connection. Moreover, wireless communication networks offer mobility and flexibility for users. For example, doctors and nurses in hospitals can use hand-held devices or notebook computers to access patient information from a server through wireless networks without having to search for a physical jack to plug their devices or computers into. In terms of flexibility, a wireless communication network of nodes can be configured and/or reconfigured for a temporary assignment, operation, or mission.

A problem that exists in many wireless communication networks is that of providing a comprehensive security scheme that ensures privacy and integrity of data and voice communication. Some wireless networks utilize cryptographic techniques to convert unencrypted information or signals into information or signals using secret conventions called keys, such that the information or signals are unintelligible to third parties who are not aware of the secret (i.e., the key) used to convert the signals, or to perform the reverse operation using hardware or software means designed for this purpose. Cryptography can be useful for detecting loss of data integrity, authenticating players, and protecting confidential information.

One existing cryptographic approach involves a wireless node sharing a group key with the remaining nodes of the wireless network. Unfortunately, should any one device on the wireless network fall into the hands of an attacker, the security of every device in the network can be compromised.

This problem is exacerbated in an environment that includes a network of mobile wireless nodes (i.e., radios) that are likely to be lost during normal operations. An exemplary network is a temporary wireless communication network configured for a military operation. Typically, multi-party intercommunication within such a network (i.e., communications between more than two parties) calls for security critical assets, such as algorithms and keying information, to be stored in each mobile node. The loss of one mobile node can result in the loss of these security critical assets, thus compromising the larger system.

This problem has been mitigated somewhat in two party communication networks using public key management techniques for generating a unique traffic encryption key between two nodes. Since all secure communication sessions have a unique traffic encryption key, the loss of a node only creates the potential for insecure communications between those two nodes. Unfortunately, such techniques cannot be used for multi-party intercommunications.

A Type 1 product is defined as a classified or controlled cryptographic item (CCI) endorsed by a regulatory agency, such as the United States National Security Agency for securing classified and sensitive government information, when appropriately keyed with a secret trusted key. Unfortunately in a communication network of Type 1 mobile nodes keyed with a secret trusted key, the loss of a mobile node and its recovery by an adversary could be devastating to the outcome of a field operation as well as all future communications within the system of similarly keyed products is compromised. Accordingly, rekeying of all similarly keyed products is required following loss of one of the mobile nodes. This rekeying presents a significant logistics problem. Moreover, personnel that use and are responsible for the Type 1 mobile nodes (radios) may not purchase them or may not deploy them if losing a radio during a field operation can result in a security incident.

Consequently, what is needed is technique for enhancing the security of a wireless communication network. What is further needed is a technique for securing communication over a wireless communication network in which loss of a mobile node (radio) does not represent the loss of security critical keying information.

SUMMARY OF THE INVENTION

Accordingly, it is an advantage of the present invention that a method of key management in a communication network is provided.

It is another advantage of the present invention that a method and system are provided that enable secure communication between nodes using unclassified algorithms.

Another advantage of the present invention is that a method and system are provided that can rapidly recover secure communication capability following the loss of a mobile node.

The above and other advantages of the present invention are carried out in one form by a method of key management in a communication network that includes a central node and a vulnerable node. The central node is loaded with a trusted key, and the central node and vulnerable node are loaded with key material corresponding to a key agreement protocol. The method calls for establishing a secure connection between the central node and the vulnerable node using the key material to generate a session key for the secure connection, and utilizing the trusted key and the session key to produce a mission key. The mission key is transferred from the central node to the vulnerable node via the secure connection, the mission key being functional for secure communication within the communication network.

The above and other advantages of the present invention are carried out in another form by a central node for facilitating key management in a communication network that includes the central node and vulnerable nodes, each of the central node and the vulnerable nodes being loaded with key material corresponding to a key agreement protocol. The central node comprises memory for storage of a trusted key from a trusted authority and for storage of the key material. The central node further includes a transceiver for communication with the vulnerable nodes, and a control unit coupled to the memory and the transceiver. The control unit has executable code to cause the central node to perform a method of key management comprising establishing successive secure connections between the central node and the vulnerable nodes, and using the key material to generate unique session keys for the successive secure connections. The trusted key and a first one of the unique session keys are combined to produce a mission key, and the mission key is transferred from the central node to each of the vulnerable nodes via the successive secure connections using the unique session keys. The mission key is functional for secure communication within the communication network.

The above and other advantages of the present invention are carried out in yet another form by a communication network that includes a central node and a vulnerable node. The central node includes a first memory for storage of a trusted key and key material corresponding to an asymmetric key agreement protocol, a first transceiver, and a first control unit coupled to each of the first memory and the first transceiver. The vulnerable node includes a second memory for storage of the key material corresponding to the asymmetric key agreement protocol, a second transceiver, and a second control unit coupled to each of the second memory and the second transceiver. The central node and the vulnerable node have executable code to cause the central node and the vulnerable node to perform a method of key management. The method of key management calls for establishing a secure connection between the central node and the vulnerable node using the key material to generate a session key for the secure connection, combining the trusted key and the session key to produce a mission key, and encrypting the mission key with the session key at the central node to produce ciphertext. The ciphertext is transferred from the central node to the vulnerable node via the secure connection, and the ciphertext is decrypted at the vulnerable node utilizing the session key to obtain the mission key. Each of the central node and the vulnerable node utilize the mission key for secure communication within the communication network.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 6 shows a flowchart of a mission key administration subprocess of the key management process.

DETAILED DESCRIPTION OF THE PREFERRED EMBODIMENTS

The present invention involves a method and system of key management within a communication network. The present invention utilizes a combination of asymmetric session key establishment techniques and symmetric key management techniques that results in creation of a temporary key, referred to herein as a mission key. The mission key is subsequently utilized to secure communications within the communication network, and can be readily changed to recover secure communication capability in the event of a loss of a node within the network.

The present invention is described herein for use within a small tactical secure communication network, such as that which might be used in a field mission during military operations. However, the present invention is not limited to such a use. Rather, the present invention may be employed in a number of computing environments, sensor networks, communication networks utilized by a civilian population, and the like, where secure communication is desired.

Figure 1:
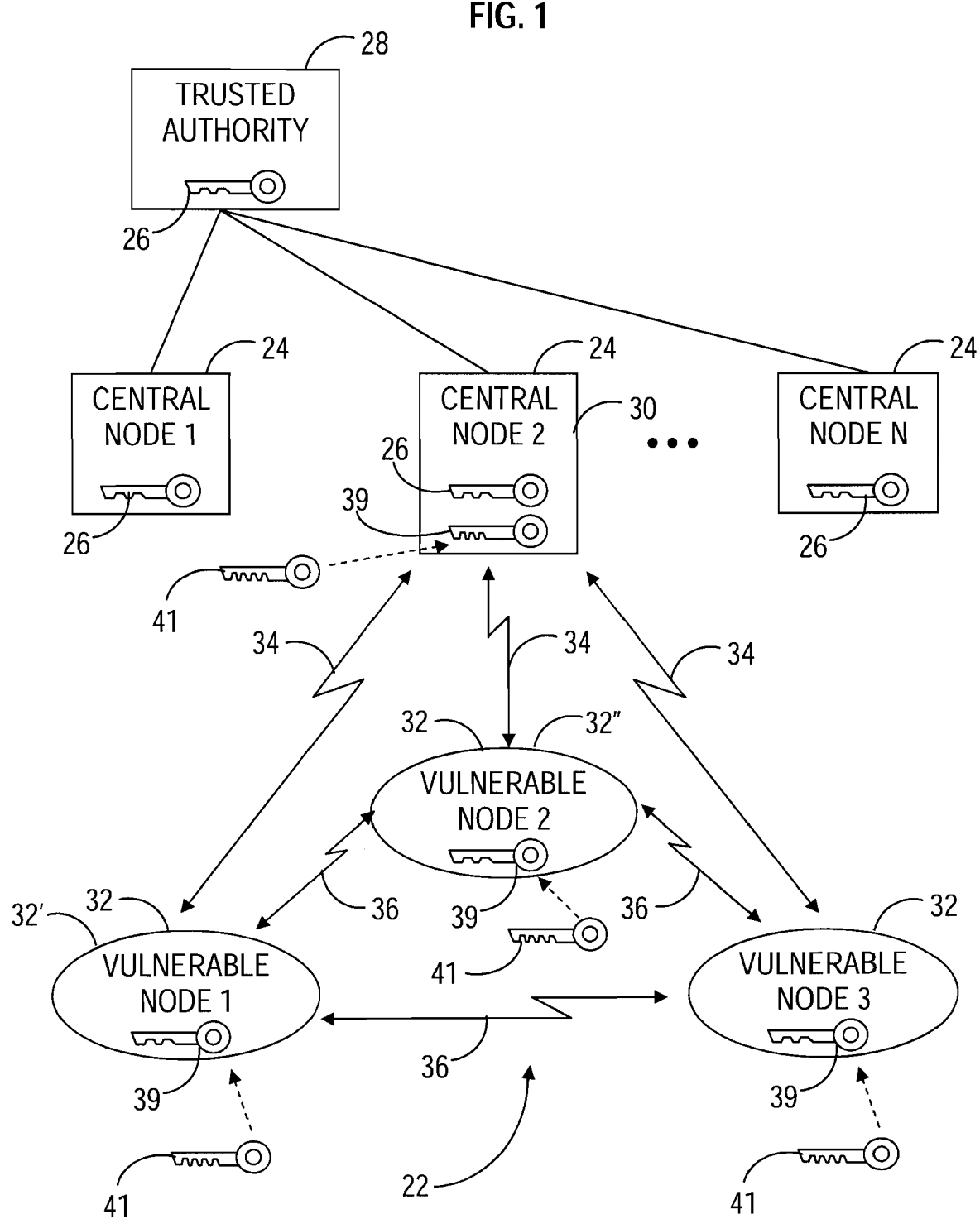
FIG. 1 shows a configuration of an environment in which a wireless communication network may be deployed in accordance with a preferred embodiment of the present invention.

FIG. 1 shows a configuration of an environment 20 in which a wireless communication network 22 may be deployed. Environment 20 includes a number of central nodes 24, each of which is filled, or loaded, with a trusted key 26 from a trusted authority 28. A first central node 30 of central nodes 24 is utilized within wireless communication network 22. Wireless communication network 22 further includes a plurality of vulnerable nodes 32 capable of communicating through first central node 30 with other vulnerable nodes 32, as well as with first central node 30, via wireless links 34. In addition, vulnerable nodes 32 are capable of communicating directly with one another via wireless links 36 during the mission.

The term "vulnerable node" used herein refers to a mobile node (for example, a handheld radio) that may be deployed during a field mission and may be subject to loss and recovery by an adversary. In contrast the term "central node" used herein refers to a radio device that is positioned at a more protected location, for example, in a helicopter, airplane, ship, or at a strategically held stationary location. First central node 30 is more protected than vulnerable nodes 32 because it has a lower probability of loss and subsequent recovery by an adversary.

Although communication network 22 is shown as being a network of one central node 30 and three vulnerable nodes 32, communication network 22 can include any number of vulnerable nodes 32 including one, two, or more than three vulnerable nodes 32 in accordance with the intended goals of communication network 22.

Trusted authority 28 is an end user key management infrastructure that provides for the generation, production, distribution, control, revocation, recovery, and tracking of cryptographic key material, such as trusted key 26. In general terms, trusted key 26 may be a symmetric key in a format that can be easily copied. Typically, trusted key 26 may be used to enable communication services, i.e. encryption and decryption, between similarly keyed devices, in this case central nodes 24. Since trusted key 26 is in a form that can be readily copied, trusted key 26 must be kept secret to maintain confidentiality. Thus, if a product keyed with trusted key 26 falls into the hands of an adversary, the communication security for similarly keyed products, e.g. central nodes 24, can be compromised. The present invention does not utilize trusted key 26 in accordance with traditional methodologies to directly protect communications. Rather, trusted key 26 is used as a component in generating a mission key (discussed below). Therefore, a compromise of a product containing trusted key 26 does not in and of itself compromise communication network 22.

Although environment 20 only shows three central nodes 24 that are keyed with trusted key 26, is should be understood that a number of central nodes 24 or other products (not shown) that make up the system of environment 20 may be keyed with trusted key 26, with the exception of vulnerable nodes 32, in accordance with the intended goals of environment 20.

In accordance with the present invention, central node 30 of communication network 22 has trusted key 26 loaded therein, while vulnerable nodes 32 do not. However, as will be discussed below, central node 30 and each of vulnerable nodes 32 of communication network 22 are loaded with a first mission key 39 that is based upon trusted key 26. First mission key 39 allows for secure communication within communication network 20 without necessitating the transfer of trusted key 26 into vulnerable nodes 32. Moreover, should one of vulnerable nodes 32 be lost during a field mission, first mission key 39 is discarded and is replaced by a second mission key 41 at each of central node 30 and any remaining vulnerable nodes 32 so that secure communication within network 22 can subsequently take place using second mission key 41.

Figure 2:
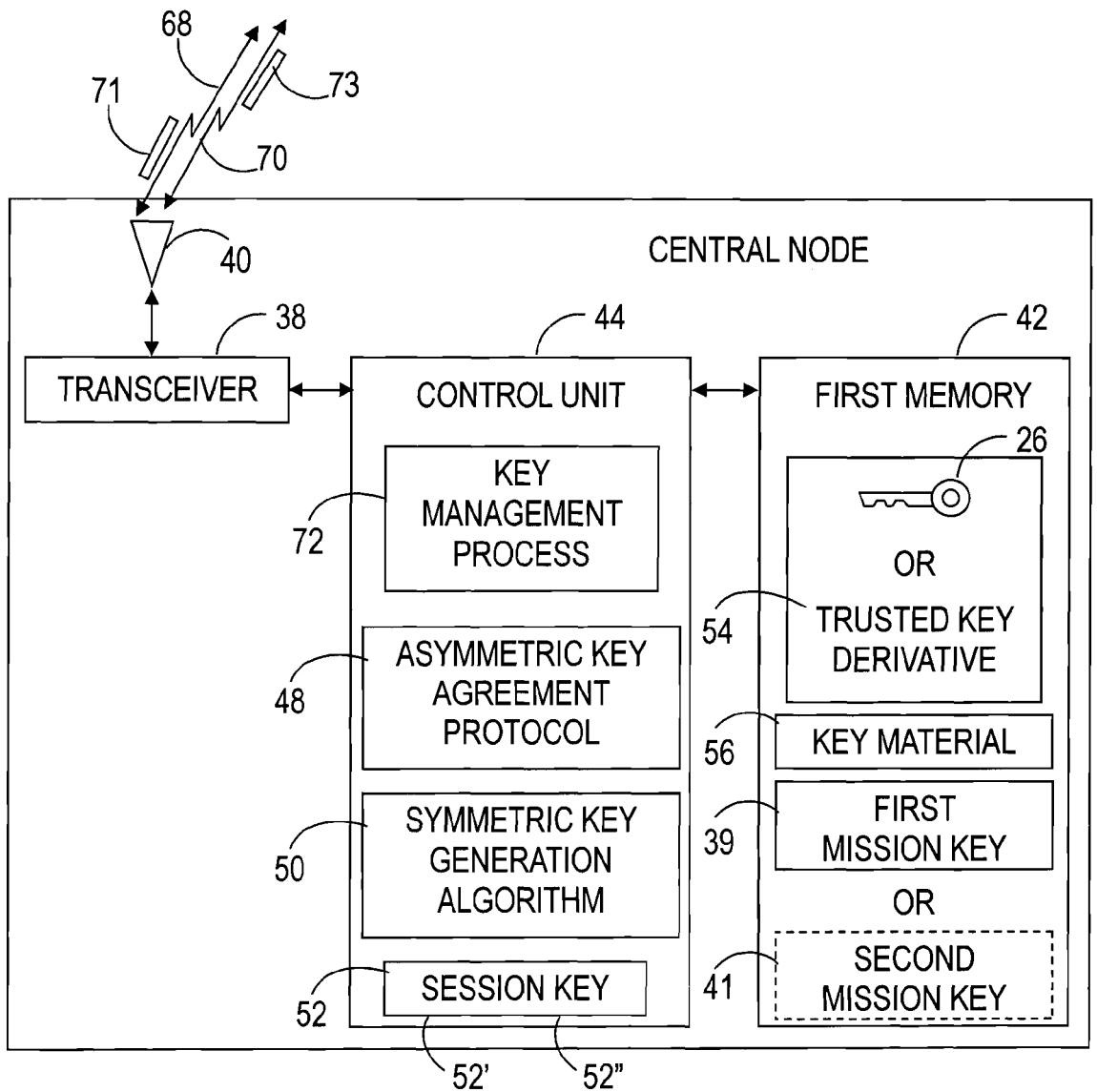
FIG. 2 shows a block diagram of a central node of the wireless communication network.

FIG. 2 shows a block diagram of central node 30 of wireless communication network 22 (FIG. 1). Central node 30 includes a first transceiver 38 capable of communication via a first antenna 40 with vulnerable nodes 32 (FIG. 1). Central node 30 further includes first memory 42, and a first control unit 44 coupled to first memory 42 and first transceiver 38. First control unit 44 includes executable code in the form of a key management process 72, an asymmetric key agreement protocol 48, and a symmetric key generation algorithm 50. Asymmetric key agreement protocol 48 is executed as part of key management process 72 to generate and retain a temporary session key 52. Session key 52 is utilized by symmetric key generation algorithm 50 as part of key management process 72 to secure communication between central node 30 and one of vulnerable nodes 32.

First memory 42 is configured for storage of trusted key 26 or a trusted key derivative 54 (discussed below). In addition, first memory 42 is configured for storage of key material 56 corresponding to asymmetric key agreement protocol 48 and first mission key 39 generated through the execution of key management process 72. Key material 56 may be coded to first memory of central node 30 prior to the provision of central node 30 to wireless communication network 22 (FIG. 1), and thereafter does not change. Second mission key 41 is also shown in first memory 42 as dashed lines to represent that it may be created as a replacement for first mission key 39, should one of vulnerable nodes 32 be lost during a field mission.

Although key management process 72 is described as being executable code, those skilled in the art will recognize that key management process 72, asymmetric key agreement protocol 48, and a symmetric key generation algorithm 50 may be embodied as software, hardware, or a combination thereof. In addition, those skilled in the art will recognize that central node 30 contains many additional elements, the details of which are not necessary to the practice of the present invention.

Figure 3:
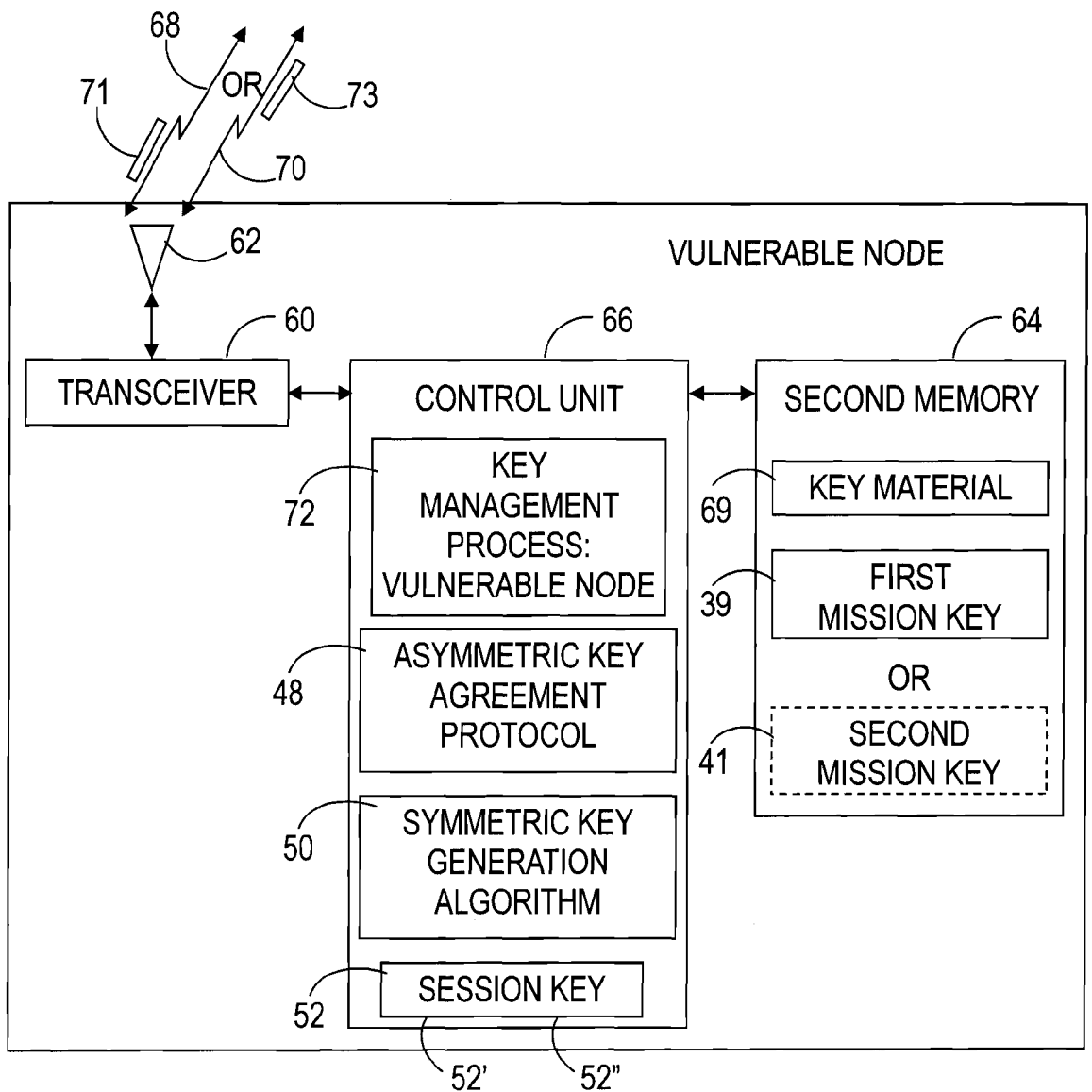
FIG. 3 shows a block diagram of a vulnerable node of the wireless communication network.

FIG. 3 shows a block diagram of one of vulnerable nodes 32 of wireless communication network 22 (FIG. 1). The elements of one of vulnerable nodes 32 are discussed herein. However, it should be understood that the following discussion applies equally to each of vulnerable nodes 32 within wireless communication network 22.

Vulnerable node 32 includes a second transceiver 60 capable of communication via a second antenna 62 with central node 30 and other vulnerable nodes 32 of communication network 22 (FIG. 1). Vulnerable node 32 further includes second memory 64, and a second control unit 66 coupled to second memory 64 and second transceiver 60. Second control unit 66 includes executable code in the form of key management process 72, asymmetric key agreement protocol 48, and symmetric key generation algorithm 50. As mentioned above, asymmetric key agreement protocol 48 and symmetric key generation algorithm 50 are executed as part of key management process 72 to generate and retain session key 52 for securing the transfer of first mission key 39 from central node 30 to vulnerable node 32.

Second memory 64 is configured for storage of key material 69 corresponding to asymmetric key agreement protocol 48 and first mission key 39. Key material 69 may be coded to second memory 64 of vulnerable node 32 prior to the provision of vulnerable node 32 to wireless communication network 22 (FIG. 1), and thereafter does not change. Second mission key 41 is also shown in second memory 64 as dashed lines to represent that it may be created as a replacement for first mission key 39, should one of vulnerable nodes 32 be lost during a field mission.

Again, although key management process 72 is described as being executable code, those skilled in the art will recognize that key management process 72, asymmetric key agreement protocol 48, and a symmetric key generation algorithm 50 may be embodied as software, hardware, or a combination thereof. In addition, those skilled in the art will recognize that vulnerable node 32 contains many additional elements, the details of which are not necessary to the practice of the present invention.

Referring to FIGS. 2-3, the operations of key management process 72 executed at central node 30 and the operations of key management process 72 executed at vulnerable node 32 operate cooperatively to govern the execution of asymmetric key agreement protocol 48 and symmetric key generation algorithm 50 and provide for secure communications between central node 30 and vulnerable nodes 32 of wireless communication network 22 (FIG. 1). In general, through the execution of key management process 72, asymmetric key agreement protocol 48 is executed to establish successive secure connections, represented by a first secure connection 68 and a second secure connection 70, between central node 30 and vulnerable nodes 32. Asymmetric key agreement protocol 48 utilizes key material 56 and key material 69 to generate unique session keys 52 for each of secure connections 68 and 70.

In FIGS. 2 and 3, the session key terminology is generally represented by the reference numeral "52." For purposes of the following discussion, the session key terminology is also represented as both a first session key 52' and a second session key 52". As discussed below, first and second session keys 52' and 52" are unique from one another, with first session key 52' being generated upon establishment of first secure connection 68 and second session key 52" being alternatively generated upon establishment of second secure connection 70.

It should be further noted in FIG. 3, that first secure connection 68 may be established when the vulnerable node is first vulnerable node 32' (FIG. 1). However, second secure connection 70 may be established as an alternative to secure connection 68 when the vulnerable node 32 is second vulnerable node 32" (FIG. 1). Accordingly, the term "OR" is shown in FIG. 3 to indicate the alternative, i.e., second secure connection 70 instead of first secure connection 68.

As will be discussed in greater detail in connection with FIGS. 4-6, first session key 52' is generated when first secure connection 68 is established. This unique first session key 52' is utilized with trusted key 26 or trusted key derivative 54 to produce first mission key 39. First mission key 39 is encrypted with first session key 52' to form first ciphertext 71. First mission key 39 is then transferred over first secure connection 68 to first vulnerable node 32' (FIG. 1) as first ciphertext 71. Second session key 52" is generated when second secure connection 70 is established. First mission key 39 is encrypted with second session key 52" to form second ciphertext 73. First mission key 39 can thus be transferred over second secure connection 70 to second vulnerable node 32" (FIG. 1) as second ciphertext 73. First mission key 39 in the form of ciphertext can then be successively transferred to each of vulnerable nodes 32 (FIG. 1) within communication network 22 (FIG. 1).

First mission key 39 is functional for secure communication between vulnerable nodes 32 and first central node 30 within said communication network 22 (FIG. 1). Since first mission key 39 is based on trusted key 26, the efficacy of first mission key 39 for providing secure communications within communication network 22 is commensurate with that of trusted key 26. Moreover, since vulnerable nodes 32 are not filled with trusted key 26, the loss of one of vulnerable nodes 32 can be readily mitigated by generating second mission key 41 (FIG. 1) and distributing it among the remaining vulnerable nodes 32 for secure communication in lieu of first mission key 39.

Figure 4:
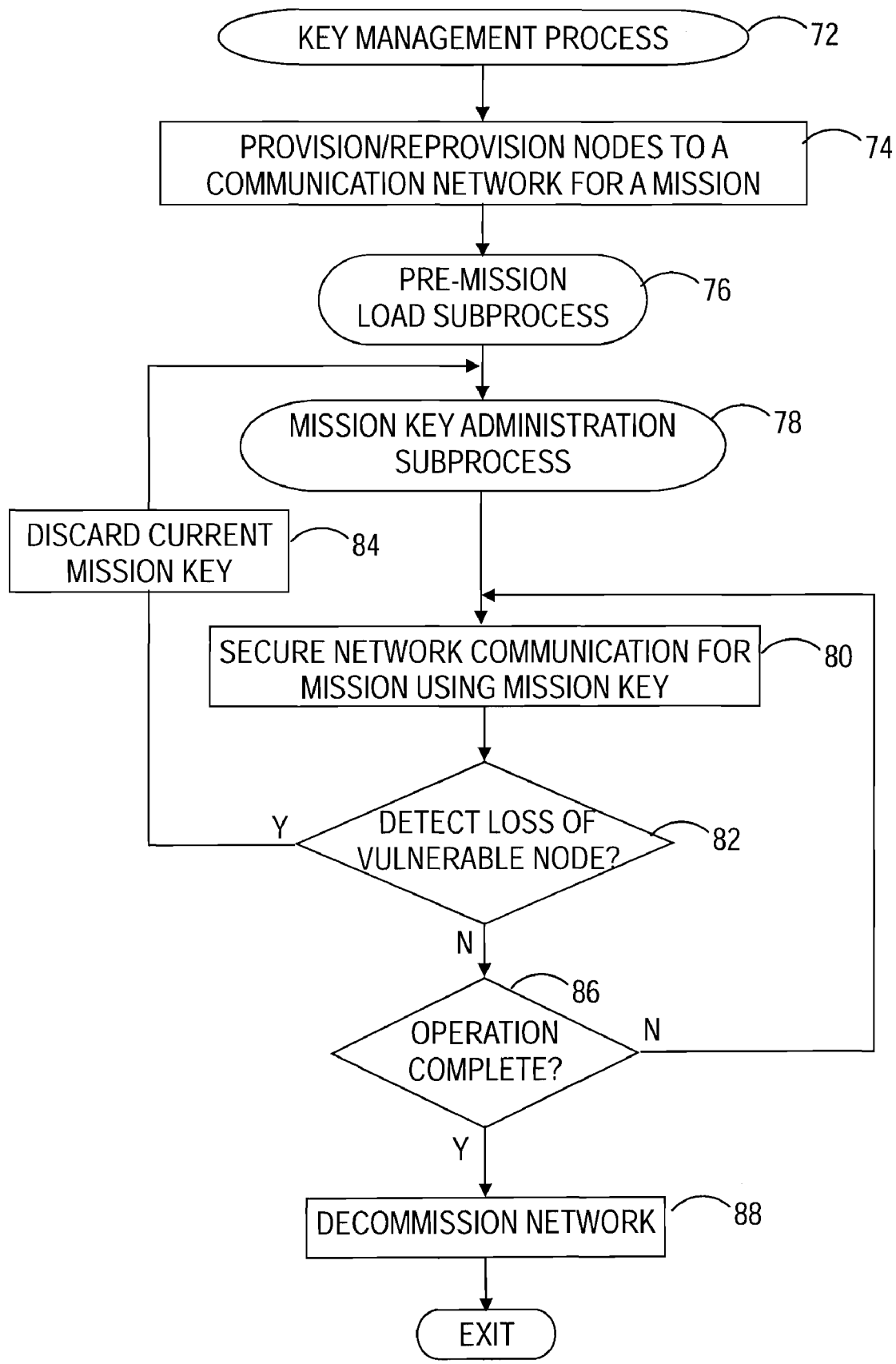
FIG. 4 shows a flowchart of a key management process carried out within the wireless communication network.

FIG. 4 shows a flowchart of key management process 72 carried out within wireless communication network 22 (FIG. 1). Key management process 72 may be initiated by a network administrator (not shown) who authorizes the establishment of a temporarily formed wireless communication network, such as communication network 22, for carrying out a particular mission, activity, or operation.

Key management process 72 begins with a task 74. At task 74, nodes such as central node 30 (FIG. 1) and a number of vulnerable nodes 32 (FIG. 1) are provisioned or reprovisioned to form wireless communication network 22 for a particular mission.

Following task 74, a pre-mission load subprocess 76 is performed. Execution of pre-mission load subprocess 76 causes the appropriate cryptographic information to be loaded into central node 30 and each of vulnerable nodes 32. The specific cryptographic information loaded into central node 30 and into each of vulnerable nodes 32 will be described in connection with FIG. 5.

Following execution of pre-mission load subprocess 76, a mission key administration subprocess 78 is performed. A first iteration of subprocess 78 results in the generation and distribution of first mission key 39 (FIG. 1) from central node 30 and the subsequent receipt of first mission key 39 at each of vulnerable nodes 32. Any subsequent iteration of subprocess 78 results in the generation of a new mission key, such as second mission key 41 (FIG. 1), at central node 30 and its subsequent transfer to vulnerable nodes 32. Mission key administration subprocess 78 will be described in connection with FIG. 6.

Once first mission key 39 has been generated at central node 30 and distributed to each of vulnerable nodes 32, a task 80 can commence. At task 80, first mission key 39 is utilized for encryption and decryption activities to secure communication between central node 30 and vulnerable nodes 32 via links 34 (FIG. 1) and/or to secure communication between any of vulnerable nodes 32 via links 36 (FIG. 1).

A query task 82 is performed in connection with task 80. Query task 82 determines whether a loss of one of vulnerable nodes 32 is detected. In a military field operation, loss of one of vulnerable nodes 32 may occur in combat, in search and rescue operations, and so forth. When a determination is made at query task 82 that one of vulnerable nodes 32 has been lost, a task 84 is performed.

At task 84, the current mission key, e.g., first mission key 39, is discarded from central node 30 and each of the remaining vulnerable nodes 32. By discarding the current mission key, an adversary who might find the lost one of vulnerable nodes 32 is largely unable to access the remaining nodes of communication network 22 (FIG. 1). Following task 84, process control loops back to mission key administration subprocess 78 where a new mission key, e.g., second mission key 41 (FIG. 1), is generated and distributed to any remaining vulnerable nodes 32. Thus, secure communications between central node 30 and remaining vulnerable nodes 32 are then carried out at task 80 using second mission key 41. However, when a determination is made at query task 82 that no vulnerable nodes 32 are lost, process control proceeds to a query task 86.

At query task 86, a determination is made as to whether the particular mission, or operation, for which radio communication network 22 (FIG. 1) was deployed is complete. When the mission is not complete, process control loops back to task 80 to continue securing network communication utilizing the current mission key, e.g. first mission key 39 or second mission key 41. However, when a determination is made that the mission is complete, process control proceeds to a task 88.

At task 88, radio communication network 22 can be decommissioned and the current mission key, e.g. first mission key 39 or second mission key 41, can be discarded so that central node 30 and vulnerable nodes 32 can be reprovisioned for another mission. Following task 88, key management process 72 exits. The execution of key management process 72 enables the generation and distribution of a temporary mission key functional for encryption and decryption services between nodes within communication network 22. Moreover, this mission key can be readily replaced in-mission in the event of the loss of any of vulnerable nodes 32.

Figure 5:
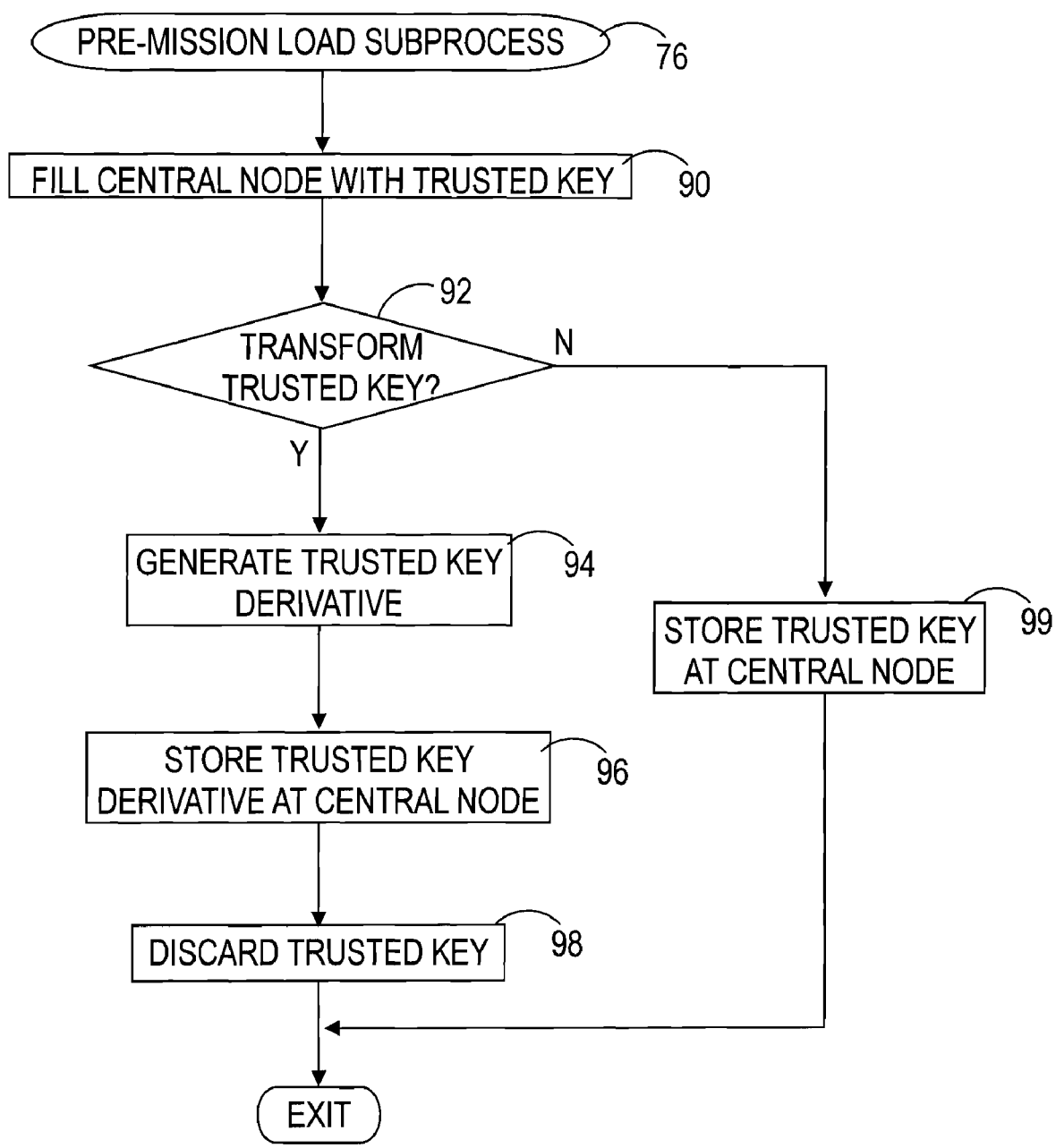
FIG. 5 shows a flowchart of a pre-mission load subprocess of the key management process.

FIG. 5 shows a flowchart of pre-mission load subprocess 76 of key management process 72. Subprocess 76 describes the tasks that occur at central node 30 and vulnerable nodes 32 of wireless communication network 22 to load cryptographic material into the devices pre-mission, i.e., prior to commencing mission specific secure communications.

Pre-mission load subprocess 76 begins with a task 90. At task 90, first memory 42 (FIG. 2) of first central node 30 (FIG. 1) is filled with trusted key 26 (FIG. 1) from trusted authority 28 (FIG. 1).

Following task 90, a query task 92 is performed. At query task 92, a determination is made as to whether trusted key 26 is to be transformed. Although central node 30 is considered to be protected by virtue of its location, in a helicopter, airplane, ship, or at a strategically held stationary location, it is still possible that it could be lost during a particular mission. Should central node 30 be lost, trusted key 26 could be compromised, thus threatening the integrity of the overall system of environment 20 (FIG. 1). Such a loss could result in a significant logistics problem and costly rekeying of the entire fleet of similarly keyed products within environment 20. Consequently, it may be desirable in some instances to transform trusted key 26 into a value unique to central node 30, yet still based on trusted key 26.

When a determination is made at query task 92 that trusted key 26 is to be transformed, process control proceeds to a task 94. At task 94, trusted key derivative 54 (FIG. 2) is generated from trusted key 26. By way of example, symmetric key generation algorithm 50 (FIG. 2) may be utilized with trusted key 26 and information specific to central node 30, such as a random number generated at central node 30, to create trusted key derivative 54 unique to central node 30. This trusted key derivative 54 can be used in lieu of trusted key 26 to generate a mission key, e.g. first and/or second mission keys 39 and 41, respectively (FIG. 1). Moreover, it is intractable to recover trusted key 26 from trusted key derivative 54 thus significantly reducing the threat to the overall system of environment 20.

A number of key generation algorithms may be utilized to generate trusted key derivative 54. In one embodiment, symmetric key generation algorithm 50 may be selected from a plurality of unclassified symmetric algorithms that are authorized for use by a regulatory agency. An exemplary algorithm is the advanced encryption standard (AES) algorithm. AES is a symmetric block cipher that is one of a set of commercially available cryptographic algorithms suitable for use in protecting classified and sensitive but unclassified information, as specified by the United States National Security Agency.

A task 96 is performed in response to task 94. At task 96, trusted key derivative 54 is stored in first memory 42 (FIG. 2)

A task 98 is performed following the generation and storage of trusted key derivative 54 at tasks 94 and 96. At task 98, trusted key 26 is discarded from central node 30.

Referring back to query task 92, when a determination is made that trusted key 26 is not to be transformed, pre-mission load subprocess 76 proceeds to a task 99. At task 99, trusted key 26 is stored in first memory 42 (FIG. 2). Following either of storage tasks 98 or 99, subprocess 76 exits.

FIG. 6 shows a flowchart of mission key administration subprocess 78 of key management process 72 (FIG. 4). Subprocess 78 describes the tasks that occur at central node 30 and at vulnerable nodes 32 of wireless communication network 22 to produce a mission key and transfer that mission key to each of vulnerable nodes 32 prior to commencing mission specific secure communications. Mission key administration subprocess 78 will be described in connection with producing and transferring first mission key 39 (FIG. 1) for clarity of illustration. However, the following discussion applies equally to the production and transfer of second mission key 41 (FIG. 1) or any other current mission key.

Subprocess 78 begins with a task 102. At task 102, a secure connection is established between central node 30 and a next one of vulnerable nodes 32. For clarity of illustration, the following tasks are discussed in connection with a first iteration of mission key administration subprocess 78. Therefore, during a first iteration of task 102, a "next" one of vulnerable nodes 32 is a first vulnerable node 32' (see FIG. 1) in communication network 22 (FIG. 1) for which first secure connection 68 is established. Establishment of first secure connection 68 at task 102 results in the generation of unique first session key 52' (FIGS. 2-3) utilizing key material 56 (FIG. 2) previously coded at central node 30 and key material 69 (FIG. 3) previously coded at first vulnerable node 32'.

As mentioned briefly above, key material 56 and key material 69 correspond to asymmetric key agreement protocol 48 (FIG. 2). In general, a key agreement protocol is a mechanism for two communicating parties to establish a symmetric key in common so that they may encrypt and decrypt information. The generated symmetric key is first session key 52' that is unique to first secure connection 68 between central node 30 and first vulnerable node 32'. In order to generate first session key 52', central node 30 contributes key material 56 and first vulnerable node 32' contributes its key material 69 to produce first session key 52'. Neither central node 30 nor first vulnerable node 32' can pre-determine first session key 52'.

A number of asymmetric key agreement algorithms may be utilized to generate first session key 52' from key material 56 at central node 30 and key material 69 at first vulnerable node 32'. In one embodiment, asymmetric key agreement protocol 48 may be selected from a plurality of unclassified asymmetric algorithms that are authorized for use by a regulatory agency. One exemplary algorithm is an Elliptic Curve Menezes-Qu-Vanstone (ECMQV) key agreement protocol. ECMQV is an authenticated protocol for key agreement based on the Diffie-Hellman scheme in which the protocol is modified to work in an arbitrary finite group, and in particular, in an elliptic curve group. ECMQV is also one of the set of commercially available cryptographic algorithms suitable for use in protecting classified and sensitive but unclassified information, as specified by the United States National Security Agency. Thus, asymmetric key agreement protocol 48, such as the ECMQV key agreement algorithm, may be used at task 102 resulting in first session key 52'.

In response to task 102, a query task 104 of mission key transfer subprocess 78 is performed. At query task 104, a determination is made as to whether the "next" vulnerable node 32 is first vulnerable node 32'. When the "next" vulnerable node 32 is first vulnerable node 32' for which first secure connection 68 is established, process control of mission key administration subprocess 78 proceeds to a task 106.

At task 106, trusted key 26 (FIG. 1) or trusted key derivative 54 (FIG. 1) is combined with first session key 52' that was generated in response to first secure connection 68 between central node 30 and first vulnerable node 32' (FIG. 1). For simplicity of the following discussion, trusted key 26 is combined with first session key 52' at task 106. However, as mentioned previously, trusted key derivative 54 may be employed as an alternative to trusted key 26. In one embodiment, trusted key 26 and first session key 52' are combined through a bitwise "exclusive OR" operator. As known to those skilled in the art, a bitwise "exclusive OR" operator compares each bit of its first operand, e.g., trusted key 26, to the corresponding bit of a second operand, e.g., first session key 52'. If both bits are ones or both bits are zeroes, the corresponding bit of the result, i.e., first mission key 39, is set to zero. Otherwise, the corresponding bit of the result is set to one. Although a bitwise "exclusive OR" operator is described herein, those skilled in the art will recognize that other current and upcoming techniques may be employed to combine trusted key 26 and first session key 52' to form first mission key 39.

Next, a task 108 is performed to store first mission key 39 in first memory 42 (FIG. 2) of central node 30. Following task 108 or when a determination is made at query task 104 that the "next" vulnerable node is not first vulnerable node 32', subprocess 78 proceeds to a task 110.

At task 110, central node 30 encrypts first mission key 39 with the current session key 52 for the current secure connection. Again, for clarity of illustration, the following tasks are discussed in connection with a first iteration of mission key administration subprocess 78. Thus, first mission key 39 is encrypted with first session key 52' to produce first ciphertext 71 (FIG. 2). That is, symmetric key generation algorithm 50 (FIG. 2) in central node 30 utilizes the first session key 52' to secure first mission key 39. As discussed above, symmetric key generation algorithm 50 may be the advanced encryption standard (AES) algorithm although such is not a limitation of the present invention.

Following encryption task 110, mission key administration subprocess 78 proceeds to a task 112. At task 112, first ciphertext 71 corresponding to first mission key 39 is transferred from central node 30 to first vulnerable node 32' for which first secure connection 68 (FIGS. 2-3) is currently established.

In response to task 112, first ciphertext 71 is received at first vulnerable node 32' via first secure connection 68. Through this secure transfer, the key value used to secure mission communications, i.e. first mission key 39, is never visible to an end user, thereby significantly decreasing the probability of a security breach caused by an insider adversary.

Following receipt of first ciphertext 71, subprocess 78 proceeds to a task 116. At task 116, first vulnerable node 32' decrypts first ciphertext 71 using first session key 52' to obtain first mission key 39.

A task 118, performed in cooperation with task 116, stores first mission key 39 in second memory 64 (FIG. 3) at first vulnerable node 32'.

Following task 118, a query task 120 is performed to determine whether there is another of vulnerable nodes 32 (FIG. 1) within wireless communication network 22 (FIG. 1) to which first mission key 39 is to be distributed. When there is another of vulnerable nodes 32, subprocess 78 loops back to task 102.

For purposes of illustration, assuming that another of vulnerable nodes 32 awaiting receipt of first mission key 39 is second vulnerable node 32", task 102 results in the establishment of second secure connection 70 (FIG. 2) between central node 30 and second vulnerable node 32" and the generation of second session key 52". Following task 102, query task 104 determines that second vulnerable node 32" is not first vulnerable node 32', and process control proceeds directly to task 110. First mission key 39 is now encrypted with second session key 52" to form second ciphertext 73 (FIG. 2) (task 110). Second ciphertext 73 is transferred from central node to second vulnerable node 32" (task 112), which is subsequently received at second vulnerable node 32" (task 114). Second ciphertext 73 is decrypted at second vulnerable node 32" using second session key 52" to obtain first mission key 39 (task 116), and first mission key 39 is stored at second vulnerable node 32" (task 118). In this manner, mission key generation subprocess 78 can be repeated to establish successive secure connections and to convey the same mission key, e.g. first mission key 39, to each of vulnerable nodes 32 or the remaining vulnerable nodes 32 within wireless communication network 22 (FIG. 1).

When query task 120 determines that there are no more vulnerable nodes 32 awaiting receipt of first mission key 39, mission key administration subprocess 78 exits.

In summary, the present invention teaches of a method and system of key management in a communication network. The method and system employ a combination of symmetric key management techniques with asymmetric key agreement protocols that results in the creation of a temporary mission key that can be readily changed in the event of the loss of a node within the communication network. When the network is a secure communication network utilized for a military mission or other covert mission, the present invention enables the nodes to communicate securely utilizing unclassified algorithms. Thus, "sensitive" information, such as a secret trusted key, is maintained and protected within a single "protected" central node of the communication network, while the vulnerable nodes are loaded with a mission key based on the trusted key. Thus, the vulnerable nodes are enabled for secure communications without the requirement of being a controlled cryptographic item.

Although the preferred embodiments of the invention have been illustrated and described in detail, it will be readily apparent to those skilled in the art that various modifications may be made therein without departing from the spirit of the invention or from the scope of the appended claims. For example, the process steps discussed herein can take on a number of variations and can be performed in a differing order then that which was presented.

What is claimed is:

1. A method of key management in a communication network that includes a central node and a vulnerable node, said central node being loaded with a trusted key, and said central node and said vulnerable node being loaded with key material corresponding to a key agreement protocol, and said method comprising:

establishing a secure connection between said central node and said vulnerable node using said key material to generate a session key for said secure connection;

utilizing said trusted key and said session key to produce a mission key;

encrypting said mission key using said session key;

transferring said encrypted mission key from said central node to said vulnerable node via said secure connection, said mission key being functional for secure communication within said communication network, and said trusted key being maintained in secrecy at said central node.

2. A method as claimed in claim 1 further comprising selecting an asymmetric key agreement protocol for said key agreement protocol.

3. A method as claimed in claim 1 further comprising selecting said key agreement protocol from a plurality of unclassified algorithms.

4. A method as claimed in claim 3 wherein said plurality of unclassified algorithms are authorized by a regulatory agency.

5. A method as claimed in claim 1 wherein said utilizing operation comprises combining said trusted key and said session key to produce said mission key.

6. A method as claimed in claim 1, wherein said encrypting produces to produce ciphertext, and said transferring operation transfers said ciphertext over said secure connection to said vulnerable node.

7. A method as claimed in claim 6 further comprising decrypting said ciphertext at said vulnerable node following said transferring operation utilizing said session key to obtain said mission key.

8. A method as claimed in claim 1 wherein said encrypting operation comprises selecting one of a plurality of unclassified symmetric algorithms for encrypting said mission key.

9. A method as claimed in claim 8 wherein said plurality of unclassified algorithms are authorized by a regulatory agency.

10. A method as claimed in claim 1 wherein said session key is a first session key, said secure connection is a first secure connection, said communication network includes a second vulnerable node, said second vulnerable node is loaded with said key material, and said method further comprises:

forming a second secure connection between said central node and said second vulnerable node using said key material to generate a second session key for said second secure connection; and conveying said mission key from said central node to said second vulnerable node via said second secure connection.

11. A method as claimed in claim 10 further comprising:

encrypting said mission key with said second session key to produce second ciphertext, said conveying operation conveying said second ciphertext over said second secure connection to said second vulnerable node; and decrypting said second ciphertext at said second vulnerable node following said conveying operation utilizing said second session key to obtain said mission key.

12. A method as claimed in claim 1 wherein said session key is a first session key, said secure connection is a first secure connection, said communication network includes additional vulnerable nodes, said key material being loaded in said additional vulnerable nodes, and said method further comprises:
- forming successive secure connections between said central node and said additional vulnerable nodes using said key material to generate unique session keys for said successive secure connections; and
- conveying said mission key from said central node to each of said additional vulnerable nodes via said successive secure connections using said unique session keys.

13. A method as claimed in claim 12 wherein said vulnerable node and said additional vulnerable nodes form a plurality of vulnerable nodes, and said method further comprises:
- determining a loss of one of said plurality of vulnerable nodes following said transferring and said conveying operations;
- establishing subsequent secure connections between said central node and remaining ones of said plurality of vulnerable nodes using said key material to generate subsequent session keys for said subsequent secure connections;
- utilizing said trusted key and one of said subsequent session keys to produce a second mission key; and
- successively transferring said second mission key from said central node to said remaining ones of said plurality of vulnerable nodes via said subsequent secure connections, said second mission key being functional for secure communication within said communication network.

14. A method as claimed in claim 13 wherein said mission key is a first mission key, and said method further comprises discarding said first mission key from said central node and said remaining ones of said plurality of vulnerable nodes in response to said determining operation.

15. A method as claimed in claim 1 further comprising transforming said trusted key using information unique to said central node to form a trusted key derivative, and said utilizing operation utilizes said trusted key derivative and said session key to produce said mission key.

16. A method as claimed in claim 15 further comprising discarding said trusted key from said central node in response to said transforming operation.

17. A central node for facilitating key management in a communication network that includes said central node and vulnerable nodes, each of said central node and said vulnerable nodes being loaded with key material corresponding to a key agreement protocol, and said central node comprising:
- memory for storage of a trusted key from a trusted authority and storage of said key material;
- a transceiver for communication with said vulnerable nodes; and
- a control unit coupled to said memory and said transceiver, said control unit having executable code to cause said central node to perform a method of key management comprising:
  - establishing successive secure connections between said central node and said vulnerable nodes using said key material to generate unique session keys for said successive secure connections;
  - combining said trusted key and a first one of said unique session keys to produce a mission key; and
  - transferring said mission key from said central node to each of said vulnerable nodes via said successive secure connections using said unique session keys, said mission key being functional for secure communication within said communication network, and said trusted key being maintained in secrecy at said central node.

18. A central node as claimed in claim 17 wherein said executable code causes said central node to perform additional operations of said method comprising for each of said successive secure connections, encrypting said mission key with a corresponding one of said unique session keys to produce ciphertext, and said transferring operation transfers said ciphertext over said each successive secure connection to said each vulnerable node.

19. A central node as claimed in claim 17 wherein said executable code causes said central node to perform additional operations of said method comprising:
- determining a loss of one of said vulnerable nodes following said transferring operation;
- establishing subsequent secure connections between said central node and remaining ones of said vulnerable nodes using said key material to generate subsequent session keys for said subsequent secure connections;
- utilizing said trusted key and one of said subsequent session keys to produce a second mission key; and
- successively transferring said second mission key from said central node to said remaining ones of said vulnerable nodes via said subsequent secure connections, said second mission key being functional for secure communication within said communication network.

20. A central node as claimed in claim 17 wherein said executable code causes said central node to perform an additional operation of said method comprising transforming said trusted key using information unique to said central node to form a trusted key derivative, and said combining operation combines said trusted key derivative and said first one of said unique session keys to produce said mission key.

21. A central node as claimed in claim 20 wherein said executable code causes said central node to perform an additional operation of said method comprising discarding said trusted key in response to said transforming operation.

22. A communication network comprising:
- a central node including a first memory for storage of a trusted key and key material corresponding to an asymmetric key agreement protocol, a first transceiver, and a first control unit coupled to each of said first memory and said first transceiver; and
- a vulnerable node including a second memory for storage of said key material corresponding to said asymmetric key agreement protocol, a second transceiver, and a second control unit coupled to each of said second memory and said second transceiver, said central node and said vulnerable node having executable code to cause said central node and said vulnerable node to perform a method of key management comprising:
  - establishing a secure connection between said central node and said vulnerable node using said key material to generate a session key for said secure connection;
  - combining said trusted key and said session key to produce a mission key;
  - encrypting said mission key with said session key at said central node to produce ciphertext;
  - transferring said ciphertext from said central node to said vulnerable node via said secure connection;
  - decrypting said ciphertext at said vulnerable node utilizing said session key to obtain said mission key; and
  - each of said central node and said vulnerable node utilizing said mission key for secure communication within said communication network, and said trusted key being maintained in secrecy at said central node.

23. A communication network as claimed in claim 22 wherein said asymmetric key agreement protocol is selected from a plurality of unclassified algorithms.

24. A communication network as claimed in claim 22 wherein said encrypting operation comprises employing one of a plurality of unclassified symmetric algorithms for encrypting said mission key.

25. A communication network as claimed in claim 22 wherein said vulnerable node is a first vulnerable node, and said network further comprises a second vulnerable node including a third memory for storage of said key material corresponding to said asymmetric key agreement protocol, a third transceiver, and a third control unit coupled to each of said third memory and said third transceiver, said second vulnerable node having said executable code to cause said second vulnerable node to perform additional operations of said method comprising:
    forming a second secure connection between said central node and said second vulnerable node using said key material to generate a second session key for said second secure connection;
    receiving second ciphertext from said central node via said second secure connection, said second ciphertext being produced at said central node by encrypting said mission key with said second session key;
    decrypting said second ciphertext utilizing said second session key to obtain said mission key; and
    utilizing said mission key at said second vulnerable node for secure communication within said communication network.

26. A communication network as claimed in claim 25 wherein executable code causes said central node to perform additional operations of said method comprising:
    determining a loss of one of said first and second vulnerable nodes;
    establishing a subsequent secure connection between said central node and a remaining one of said first and second vulnerable nodes using said key material to generate a subsequent session key for said subsequent secure connection;
    utilizing said trusted key and said subsequent session key to produce a second mission key; and
    transferring said second mission key from said central node to said remaining one of said first and second vulnerable nodes via said subsequent secure connection, said second mission key being functional for secure communication within said communication network.

27. A communication network as claimed in claim 26 wherein said mission key is a first mission key, and said executable code causes said central node to perform an additional operation of said method comprising discarding said first mission key from said central node and said remaining one of said first and second vulnerable nodes in response to said determining operation.

28. A method of key management in a communication network that includes a central node and a vulnerable node, said central node being loaded with a trusted key, said central node and said vulnerable node being loaded with key material corresponding to an asymmetric key agreement protocol, and said method comprising:
    establishing a secure connection between said central node and said vulnerable node using said key material to generate a session key for said secure connection;
    combining said trusted key and said session key to produce a mission key;
    encrypting said mission key with said session key to produce ciphertext;
    transferring said ciphertext from said central node to said vulnerable node via said secure connection;
    decrypting said ciphertext utilizing said session key at said vulnerable node to obtain said mission key; and
    utilizing said mission key at each of said central node and said vulnerable node for secure communication within said communication network, and said trusted key being maintained in secrecy at said central node.

29. A method as claimed in claim 28 further comprising encrypting said trusted key using information unique to said central node to form a trusted key derivative, and said combining operation combines said trusted key derivative and said session key to produce said mission key.

30. A method as claimed in claim 29 further comprising discarding said trusted key from said central node in response to said encrypting operation.

* * * * *